US008580205B2

(12) United States Patent
    Fallavollita (10) Patent No.: US 8,580,205 B2
(45) Date of Patent: Nov. 12, 2013

(54) METHOD AND APPARATUS FOR IMPROVING THE EFFICIENCY OF PURIFICATION AND DEPOSITION OF POLYCRYSTALLINE SILICON

(75) Inventor: John Allan Fallavollita, Edmonton (CA)

(73) Assignee: Iosil Energy Corporation, Groveport, OH (US)

(*) Notice: Subject to any disclaimer, the term of this patent is extended or adjusted under 35 U.S.C. 154(b) by 265 days.

(21) Appl. No.: 12/904,092

(22) Filed: Oct. 13, 2010

(65) Prior Publication Data

US 2011/0023778 A1      Feb. 3, 2011

Related U.S. Application Data

(62) Division of application No. 11/893,980, filed on Aug. 17, 2007, now Pat. No. 7,820,126.

(60) Provisional application No. 60/838,479, filed on Aug. 18, 2006.

(51) Int. Cl.
*B01J 8/18* (2006.01)
*C01B 33/02* (2006.01)

(52) U.S. Cl.
USPC ........... 422/142; 422/141; 422/146; 422/147; 422/198; 423/349

(58) Field of Classification Search
USPC ........... 422/141, 142, 146, 147, 198; 423/349
See application file for complete search history.

(56) References Cited

U.S. PATENT DOCUMENTS 3,006,737 A   10/1961   Moates et al.
3,012,861 A   12/1961   Ling (Continued)

FOREIGN PATENT DOCUMENTS

JP      6-87607 A       3/1994
JP      2000-191312 A   7/2000

(Continued)

OTHER PUBLICATIONS

Ciszek, et al. Alternative Solar-Grade SiliconFeedstock Approaches. National Renewable Energy Lab Conference paper. Oct. 2001.

(Continued)

*Primary Examiner* — Walter D Griffin
*Assistant Examiner* — Lessanework Seifu
(74) *Attorney, Agent, or Firm* — Wilson Sonsini Goodrich & Rosati (57) ABSTRACT

Methods and apparatus for the commercial-scale production of purified polycrystalline silicon granules with one or more tailored levels of n- and p-type impurities from an impure silicon source such as, for example, metallurgical-grade silicon. Purification systems and methods involve: (1) one or more series of temperature controlled reactors or vessels provided with dual fluidized beds wherein solids and gases are transported so that varying degrees of purification and deposition of solid silicon is accomplished by strict control of temperature and residence time; (2) separation and recovery of the compounds of high-melting-point impurities such as, for example, FeSi and $FeI_2$; (3) purification, separation, and recycling of silicon tetraiodide; (4) separation and recovery of iodide compounds of lower-boiling-point liquid impurities such as for example, $AlI_3$, in a continuous fractional distillation column, facilitated by an iodine reflux; (5) separation and recovery of very fine solid particles including impurity iodides and elemental silicon in a liquid mixture downstream of a fractional distillation column; (6) recovery of input iodine from the oxidation of both solid and liquid iodide impurity waste streams from the process.

21 Claims, 3 Drawing Sheets

(56) References Cited

U.S. PATENT DOCUMENTS

| | | | |
|---|---|---|---|
| 3,012,862 | A | 12/1961 | Bertrand et al. |
| 3,020,129 | A | 2/1962 | Herrick |
| 3,442,622 | A | 5/1969 | Monnier et al. |
| 4,092,446 | A | 5/1978 | Padovani et al. |
| 4,117,094 | A | 9/1978 | Blocher et al. |
| 4,138,509 | A | 2/1979 | Ingle et al. |
| 4,207,360 | A * | 6/1980 | Padovani ............... 427/213 |
| 4,213,937 | A | 7/1980 | Padovani et al. |
| 4,304,763 | A | 12/1981 | Dietl et al. |
| 4,307,242 | A | 12/1981 | Shah et al. |
| 4,340,574 | A | 7/1982 | Coleman |
| 4,379,777 | A | 4/1983 | Boulos |
| 4,388,286 | A | 6/1983 | Kapur et al. |
| 4,519,999 | A | 5/1985 | Coleman et al. |
| 4,642,227 | A * | 2/1987 | Flagan et al. ............ 423/349 |
| 4,910,163 | A | 3/1990 | Jain |
| 4,981,668 | A | 1/1991 | Dosaj et al. |
| 5,128,116 | A | 7/1992 | Forwald et al. |
| 5,788,945 | A | 8/1998 | Schei |
| 5,798,137 | A | 8/1998 | Lord et al. |
| 5,799,643 | A | 9/1998 | Miyata et al. |
| 6,113,473 | A | 9/2000 | Costantini et al. |
| 6,221,814 | B1 | 4/2001 | Kaburagi et al. |
| 6,281,098 | B1 | 8/2001 | Wang et al. |
| 6,322,710 | B1 | 11/2001 | Katsumata et al. |
| 6,468,886 | B2 | 10/2002 | Wang et al. |
| 6,615,817 | B2 | 9/2003 | Horio |
| 6,702,994 | B1 | 3/2004 | Henriksen et al. |
| 6,712,908 | B2 | 3/2004 | Wang et al. |
| 6,780,665 | B2 | 8/2004 | Billiet et al. |
| 6,827,786 | B2 | 12/2004 | Lord |
| 6,838,047 | B2 | 1/2005 | Billiet et al. |
| 6,915,796 | B2 | 7/2005 | Sung |
| 6,929,537 | B2 | 8/2005 | Kajimoto |
| 7,820,126 | B2 | 10/2010 | Fallavollita |
| 2002/0081250 | A1 | 6/2002 | Lord |
| 2003/0136226 | A1 | 7/2003 | Gripenberg et al. |
| 2003/0220055 | A1 | 11/2003 | Kajimoto |
| 2005/0176218 | A1 | 8/2005 | Jonczyk et al. |
| 2007/0054106 | A1 | 3/2007 | Armstrong et al. |
| 2007/0178807 | A1 | 8/2007 | Gupta et al. |
| 2008/0044337 | A1 | 2/2008 | Fallavollita |
| 2008/0223351 | A1 | 9/2008 | Morikawa et al. |
| 2010/0163462 | A1 | 7/2010 | Grabbe et al. |
| 2011/0059002 | A1 | 3/2011 | Fallavollita |
| 2011/0280785 | A1 | 11/2011 | Fallavollita |

FOREIGN PATENT DOCUMENTS

| | | | |
|---|---|---|---|
| JP | 2001-278612 | A | 10/2001 |
| JP | 2004-131299 | | 4/2004 |
| JP | 2008-290897 | A | 12/2008 |
| WO | WO 02/40407 | A1 | 5/2002 |
| WO | WO 2005/061383 | A1 | 7/2005 |
| WO | WO 2006/137098 | A1 | 12/2006 |
| WO | WO 2008/022348 | A2 | 2/2008 |
| WO | WO 2008/022348 | A3 | 4/2008 |
| WO | WO 2008/055348 | A1 | 5/2008 |
| WO | WO 2009/126922 | A2 | 10/2009 |
| WO | WO 2009/126922 | A3 | 3/2010 |

OTHER PUBLICATIONS

Glang, et al. Impurity Introduction durng Epitaxial Growth of Silicon. IBM Journal. 1960; 299-301.

Glang, et al. Silicon. The Art and Science of Growing Crystals. John Whiley and Sons. New York, NY. 1963; 80-87.

Herrick, et al. High-purity Silicon from an Iodide Process Pilot Plant. J. Electrochem. Soc. 1960; 107(2): 111-117.

Hillel, et al. Stabilité Thermique et Propriétés Thermodynamiques de Iodures de Phosphore a l'état Condensé et Gaseux. J. Chimie Physique. 1976; 73: 845-848.

Litton, et al. High Purity Silicon. J. Electrochem. Soc. 1954; 101(6): 287-292.

Szekely, G. Preparation of Pure Silicon by Hydrogen Reduction of SiliconTetraiodide. J. Electrochem. Soc. 1957; 104(11): 663-667.

Wang, et al. Atmospheric pressure iodine vapor transport for thin-silicon growth. National Renewable Energy Lab Conference paper. Oct. 2001.

Wang, et al. Growth of large-grain silicon layers by atmospheric iodine vapor transport. Journal of the Electrochemical Society. 2000; 147(5):1945-1949.

Nishijima, et al. Recycling of abrasives from wasted slurry by superconducting magnetic separation. IEEE Transactions on Applied Superconductivity. Jun. 2003; 13(2):1596-1599.

Office action dated Jan. 19, 2010 for U.S. Appl. No. 11/893,980.

Office action dated Jul. 31, 2012 for U.S. Appl. No. 12/865,989.

Fallavollita, John Allan. U.S. Appl. No. 13/718,389, entitled "Methods and Apparatus for Recovery of Silicon and Silicon Carbide from Spent Wafer-Sawing Slurry," filed Dec. 18, 2012.

European search report and opinion dated Mar. 4, 2013 for EP Application No. 07841098.2.

Office action dated Jan. 24, 2013 for U.S. Appl. No. 12/865,989.

* cited by examiner

METHOD AND APPARATUS FOR IMPROVING THE EFFICIENCY OF PURIFICATION AND DEPOSITION OF POLYCRYSTALLINE SILICON

CROSS-REFERENCE

This application is a divisional application of Ser. No. 11/893,980, filed Aug. 17, 2007, which claims the benefit of priority to U.S. Provisional Application No. 60/838,479, filed Aug. 18, 2006, which applications are incorporated by reference herein in their entirety.

FIELD OF INVENTION

The present invention relates to methods of producing silicon feedstock, and more specifically, to purifying impure silicon, by means of iodine chemical vapor transport to produce pure silicon feedstock for use in fabricating photovoltaic and other semiconductor devices.

BACKGROUND OF INVENTION

The market demand for solar energy collection systems in the form of photovoltaic cells (PV) is growing in excess of 25% per year globally due to factors including higher oil prices and government policies addressing such environmental issues as global warming. The dominant substrate material for PV is silicon, which accounts for about 90% of installed commercial units at the present time. A serious shortcoming in the silicon-based PV value chain, however, is that there is presently no direct method of producing PV-grade polycrystalline silicon (PV-Si) at competitive prices. The main reason for this situation is that, historically, the PV industry relied mostly on scrap silicon material that was recycled from the microelectronics industry. Recently, the global demand for PV-Si has outstripped the supply of recycled electronic-grade silicon (REG-Si) and the expectation is that this source of silicon will no longer be able to meet the demand from the PV industry.

Many PV manufacturers are now considering direct purchase of electronic-grade silicon (EG-Si), which is also in tight supply, but whose price is as much as 10 times higher than the historical average price of REG-Si. The higher price of EG-Si is mainly due to the complexity and high capital cost of the trichlorosilane and silane processes that dominate this industry at the present time. In many cases, the EG-Si producers are also forward integrated into the microelectronics value chain and so these processes are optimized for that end-user market. What is required for the PV industry is a process that is simpler, more economical, and safer to operate than the dominant EG-Si processes.

In U.S. Pat. Nos. 6,712,908 and 6,468,886, Wang et al. disclose a three-step process for the production of PV- and EG-silicon. In the first step, impure metallurgical-grade silicon (MG-Si) is reacted with iodine at a temperature, (T<900° C.), which favors the formation of silicon tetraiodide, $SiI_4$. Sufficient $SiI_4$ is then produced in this fashion to fill a holding tank. Once the required amount of $SiI_4$ is produced it is then recycled to the initial reactor stage where the temperature has been increased to above 1200° C. and the $SiI_4$ reacts with MG-Si to produce substantial quantities of an unstable silicon diiodide vapor compound, $SiI_2$. The $SiI_2$ is transported by natural convection to a cooler region of a "cold-wall" reactor where it decomposes and deposits as polycrystalline silicon on solid substrates that can be inert or high-purity silicon rods.

However, there exist a number of problems associated with the teachings of this invention and others in the prior art, that, taken together, prevent the realization of a scalable and economical method for the production of PV- and EG-silicon. These shortcomings are described in detail below.

1. The use of a "cold-wall" vessel for the reaction and deposition of silicon is critical to the method and apparatus of the invention disclosed by Wang et al. Yet this leads to poor control of the spatial distribution of silicon deposition due to three factors: 1) the $SiI_2$ decomposition reaction that forms silicon is a function of temperature; 2) $SiI_2$ readily decomposes to form solid silicon in the vapor phase without the requirement of a solid substrate; 3) the temperature gradient between the $SiI_2$ formation zone (i.e., T~1200° C.) and wall region (i.e., T=200-700° C.) of the reactor is at least 500° C. Furthermore, as the product vapors that are saturated with $SiI_2$ form in the reactor bottom, some of the vapor travels toward the cooler walls and thereby creates a thermodynamic driving force for fine silicon powder nucleation within the vapor phase. The quantity of silicon powder may be anywhere from 10-50% of the total silicon produced at any given time. This silicon powder will be produced homogeneously and will be entrained along with the liquid silicon tetraiodide, $SiI_4$, stream as it is injected into a batch distillation column. As there are no provisions for the separation of the entrained silicon fines, the distillation column operation will be compromised and the process will need to be shutdown for frequent cleaning thereby making the process less viable. Also, the silicon thus produced is very fine and not generally in a usable form due to its tendency to oxidize with air at ambient conditions in the facilities of the end-user ingot and wafer manufacturers. To summarize, the interaction of the three factors described above results in the production of a substantial amount of silicon product that is both unsuitable for sale and difficult to remove from the process, thereby reducing the economic viability of Wang et al.

2. More than half of the weight of impurities in MG-Si typically consists of Fe atoms. While Fe reacts with $SiI_4$ to form $FeI_2$ vapor in the lower part of the cold-wall chamber at temperatures of about 1250° C., as the vapor temperature decreases to 700-800° C. near the cold-wall, the Fe is converted to solid FeSi. Due to the poor control of temperature in the cold-wall reactor, it is likely that a majority of Fe atoms will be entrained as solids within the liquid stream of silicon tetraiodide as it is directed to the distillation unit.

Again, as in the case of gas-phase silicon formation, these impurities affect the operation of the distillation column by contaminating the recycle stream and plugging of distillation column internals. As the teachings of Wang et al. do not accommodate the removal of these impurities, they tend to build up in the process and will be recycled back into the cold-wall reactor where they substantially reduce the overall efficiency of purification.

3. The cold-wall reactor is operated as a natural-convection driven system and this leads to the formation of a vapor cloud located near the uppermost region of the reactor. Because of the existence of this vapor cloud, the preferential removal of Boron (B) and Phosphorous (P) on the top section of the reactor does not occur as there is no provision made for preferentially removing the iodides of these elements from the other predominant compounds in the vapor cloud such as silicon tetraiodide, iodine, and other impurities. Also, any elemental silicon or silicon iodide that is inadvertently removed from this section of the reactor is not recoverable by the teachings of Wang et al.

4. Wang et al. teaches a method and apparatus for purifying silicon tetraiodide in a distillation column that is operated in a batch mode with the input $SiI_4$ stream introduced in the bottom section. This type of system is referred to as a "batch distillation without reflux". In this mode of operation, the level of purification is generally not very good and certainly cannot meet the 10,000-to-1 or more reduction of impurities levels in $SiI_4$ required for the process to be effective in the recycle loop. Furthermore, large-scale use of batch distillation is not generally practiced because of the high costs associated with startup and shutdown operations.

5. Iodine raw material added to the process is typically more expensive than the MG-Si. Therefore, the need to minimize the use of iodine within the process and to recover iodine from impurity output streams is an important part of ensuring an economically scalable process. The method and apparatus of Wang et al. does not teach how to recover iodine from the solid and liquid iodides formed (e.g., $FeI_2$ and $AlI_3$). Furthermore, Wang et al. does not show how to minimize the use of iodine within the process to minimize initial capital and operating costs for the commercial plant.

6. The method and apparatus of Wang et al. assumes that there is no free-iodine (i.e., I or $I_2$) left in the system once the second stage of operation is started and silicon tetraiodide is recycled into the cold-wall reactor. Thermodynamic calculations reveal, however, that between 1100-1300° C. the reaction between solid Si and $SiI_4$ vapor in the reactor bottom produces the following compounds with the stoichiometry indicated:

$$Si_{(s)} + 2.5 SiI_4 \Leftrightarrow 3.4 SiI_2 + 2.3 I + 0.3 I_2 + 0.1 SiI_3$$

By neglecting to account for the presence of free iodine, the distillation column design ignores the need to condense, purify, and recycle this expensive raw material as there is no reflux capability on the top of the column.

7. In a commercial process, the iodine raw material will contain impurities that need to be removed. If the source of the iodine is a caliche ore deposit then these impurities are generally water, non-volatile solids, and chloride-bromide compounds. No means to remove these impurities is disclosed in Wang et al.

8. Wang et al. does not provide an economical method for producing EG-Si. Experimental results provided by the teachings, for example, indicate a purity level for B and P of 4 and 7 ppm atomic, respectively, for the case where there is no recycling of purified $SiI_4$. In order to decrease the B and P levels even further to the EG-Si specifications that are in parts per billion will require a recycle ratio of $SiI_4$-to-input MG-Si that is in the range of 100-1,000. This amount of recycling is prohibitively expensive in commercial systems and so a method is needed to substantially reduce the $SiI_4$ recycle ratio and the size of the distillation column to make this chemistry economical versus the competing trichlorosilane and silane methods previously discussed.

9. Natural convection is the primary mode of mass transport in the "cold-wall" reactor. This method of mixing reactants does not lead to high productivity and is generally avoided in chemical process systems in commercial applications because it leads to unnecessarily high capital costs for plant and equipment.

10. There is no means to remove liquid iodide impurities in the batch distillation column that have higher boiling points than $CI_4$.

In sum, the deficiencies in the forgoing invention make it very difficult to economically produce purified silicon on a commercial-scale.

Other related art includes: U.S. Pat. No. 3,006,737 to Moates et al; U.S. Pat. No. 3,020,129 to Herrick; U.S. Pat. No. 4,910,163 to Jain; and U.S. Pat. No. 6,281,098 to Wang et al.

Related publications include: Herrick, C. S. et al., "High-purity Silicon from an Iodide Process Pilot Plant," J. Electrochem. Soc., Vol. 107, No. 2, February 1960, pp. 111-117; Glang, R. et al., "Silicon", in The Art and Science of Growing Crystals, John Wiley and Sons, New York, 1963, pp. 80-87; Szekely, G., "Preparation of Pure Silicon by Hydrogen Reduction of Silicon Tetraiodide," J. Electrochem. Soc., Vol. 104, No. 11, November 1957, pp. 663-66'7; Litton, F. B., et al., "High Purity Silicon," J. Electrochem. Soc., Vol. 101, No. 6, June 1954, pp. 287-292; Glang R., et al., "Impurity Introduction during Epitaxial Growth of Silicon," IBM Journal, July 1960, pp. 299-301; and Hillel, R. et al., "Stabilité Thermique et Propriétés Thermodynamiques des Iodures de Phosphore a l'état Condensé et Gaseux," J. Chimie Physique, Vol. 73, No. 9-10, 1976, pp. 845-848.

SUMMARY OF INVENTION

Accordingly, the invention provides methods and systems for producing or purifying silicon for many commercial applications from a variety of source materials. The present invention further provides processes that are scalable to commercial capacity (i.e., 500-5,000 tonne per year) for producing PV- and EG-grade silicon from an impure silicon source such as metallurgical- or chemical-grade silicon (typically 98-99.5% pure silicon).

Another aspect of the present invention also provides economical, high through-put methods of depositing pure silicon granules which are useful for applications in the continuous processes of leading PV manufacturers using string ribbon or spherical cells.

The present invention also provides an apparatus by which to produce pure granular silicon feedstock.

Some embodiments of the invention provide methods of producing pure granular silicon feedstock by continuously feeding impure silicon and a stream including purified, recycled $SiI_4$ and $I_2$ into a first unit (a two-stage fluidized-bed reactor system). The first fluidized bed may contain an inert solid material such as silica that is maintained at a constant temperature throughout the reactor volume and from which emerges a vapor mixture containing the vapors $SiI_2$, $SiI_4$, I, $I_2$, iodide vapors of impurity elements contained in MG-Si, and entrained solid fines including unreacted MG-Si. This vapor/solids mixture is transferred without significant temperature drop into a separation vessel such as a cyclone whereupon the solid and vapor phases are essentially separated so that most of the entrained fines including impure silicon are recovered, directing the remaining vapor phase to a fluidized bed that is maintained at a substantially lower temperature and that initially contains some pure silicon seed particles in suspension whereupon the $SiI_2$ reacts both in the vapor phase to produce pure solid silicon nuclei and on the pure solid silicon seed particles to form a thin film.

The proportion of gas-phase to seed-particle silicon formation can be controlled by varying the fluidized bed temperature, vapor composition, and quantity of seed particles. In this fashion, the fluidized bed seed particles grow in size over time and new silicon nuclei are formed in the gas phase to replenish the fluidized bed. The high surface area of the second fluidized bed allows for high production rates of silicon and a scalable method for commercial production. The excellent control of temperature in the fluidized bed further enhances the controllability and optimization of the overall process.

The vapor stream exiting the second fluidized bed reactor includes mostly $SiI_4$, I, $I_2$, and $SiI_3$ vapor, iodide vapors of the elemental impurities of MG-Si, and entrained pure silicon nuclei formed during the vapor-phase deposition reaction.

This vapor/solid mixture is transferred to a solid/gas separator, such as a cyclone, that is held at a slightly lower temperature than the second fluidized bed so as to minimize further silicon nucleation in the vapor phase downstream of the second fluidized bed. The pure silicon nuclei are trapped in the cyclone and then returned to the fluidized bed to act as seed particles for further silicon deposition. Pure silicon granules in the second fluidized bed can either be removed from the process and sold or transferred to a further purification step in a second unit wherein another dual fluidized bed reactor system repeats the reaction/deposition process previously described.

In this way, the purity of the resulting silicon granules can be tailored by using one or more units that alter the composition of n- and p-type impurities in the granular silicon product. The second unit deposition fluidized bed has a silicon purity range that is 10-100 times greater than the silicon granules entering from the first unit. Further repetition of this process can occur in further units, but economics will generally dictate the maximum number of units.

The vapor stream exiting the gas/solid separator in the first unit is then cooled rapidly via a heat exchanger network to a temperature of between 700-800° C. to capture solids such as FeSi and then transferred to a high-temperature gas-filter system which removes these and other solids in the gas stream.

The remainder of the vapor mixture is directed to another heat exchanger system whereupon the temperature is reduced further to between 200-300° C. thereby condensing a portion of the vapor and this liquid/vapor mixture is then introduced into a continuous fractional distillation column at two locations, near the middle point of the column's length and near the lower part of the column. The composition of the liquid and vapor in the distillation column is mostly $SiI_4$. As iodine makeup is required in the process, a relatively pure iodine vapor/liquid stream is introduced into the fractional distillation column closer to the upper section of the column and is further purified within the column. In the distillation column, the products and their output locations are as follows: higher boiling point iodides (i.e., $AlI_3$, $TiI_4$, $CI_4$, and $PI_3$) are removed near the bottom zone; $SiI_4$ is removed near the middle zone; lower boiling point compounds (i.e., $BI_3$) are withdrawn near the upper zone; and purified iodine is removed at the top and acts as the reflux to the column thereby providing steady state operation. Pure iodine liquid and $SiI_4$ produced in this fashion are transferred to a liquid/solid-filter that removes any fine particles that may have been entrained into or formed within the distillation column. Part of the filtered liquid stream containing iodine and $SiI_4$ is then recycled back to the first unit fluidized bed reactor and, if the final silicon purity target requires it, part is directed to the second unit dual fluidized bed reactors in such proportions that assist the further purification of silicon. The entire process is typically operated at a pressure only slightly above 100 kPa absolute pressure but the distillation column may also be operated under vacuum conditions.

All of the impurity iodides which are collected in either the first or second units (e.g., solid $FeI_2$, liquid $AlI_3$, and liquid $PI_3$) are mixed together in a liquid/solid slurry and continuously injected into a heated reactor at 400-900° C. in a dry atmosphere containing oxygen. Under these conditions, the oxides of most of the impurity elements are more stable than their corresponding iodides and will thus release the iodine as a vapor with a conversion efficiency of 90-95 percent. The iodine-laden gas stream is then cooled in stages to below the melting point of iodine and the resultant pure liquid iodine is recycled to the pure iodine feed stream upstream of the distillation column. In this manner, most of the iodine fed to the polysilicon production process is recovered and reused.

Other goals and advantages of the invention will be further appreciated and understood when considered in conjunction with the following description and accompanying drawings. While the following description may contain specific details describing particular embodiments of the invention, this should not be construed as limitations to the scope of the invention but rather as an exemplification of preferable embodiments. For each aspect of the invention, many variations are possible as suggested herein that are known to those of ordinary skill in the art. A variety of changes and modifications can be made within the scope of the invention without departing from the spirit thereof.

BRIEF DESCRIPTION OF THE DRAWINGS

The accompanying drawings, which are incorporated herein and form part of the specification, illustrate preferred embodiments of the present invention, and together with the description, serve to explain the principles of the invention.

INCORPORATION BY REFERENCE

All publications and patent applications mentioned in this specification are herein incorporated by reference to the same extent as if each individual publication or patent application was specifically and individually indicated to be incorporated by reference.

DETAILED DESCRIPTION OF PREFERABLE EMBODIMENTS

The invention provides methods and apparatus for generating one or more polysilicon feedstock products containing tailored levels of n- and p-type impurities. Variable grades of silicon can be produced at high throughputs and low cost with the process and apparatus disclosed herein.

Figure 1:
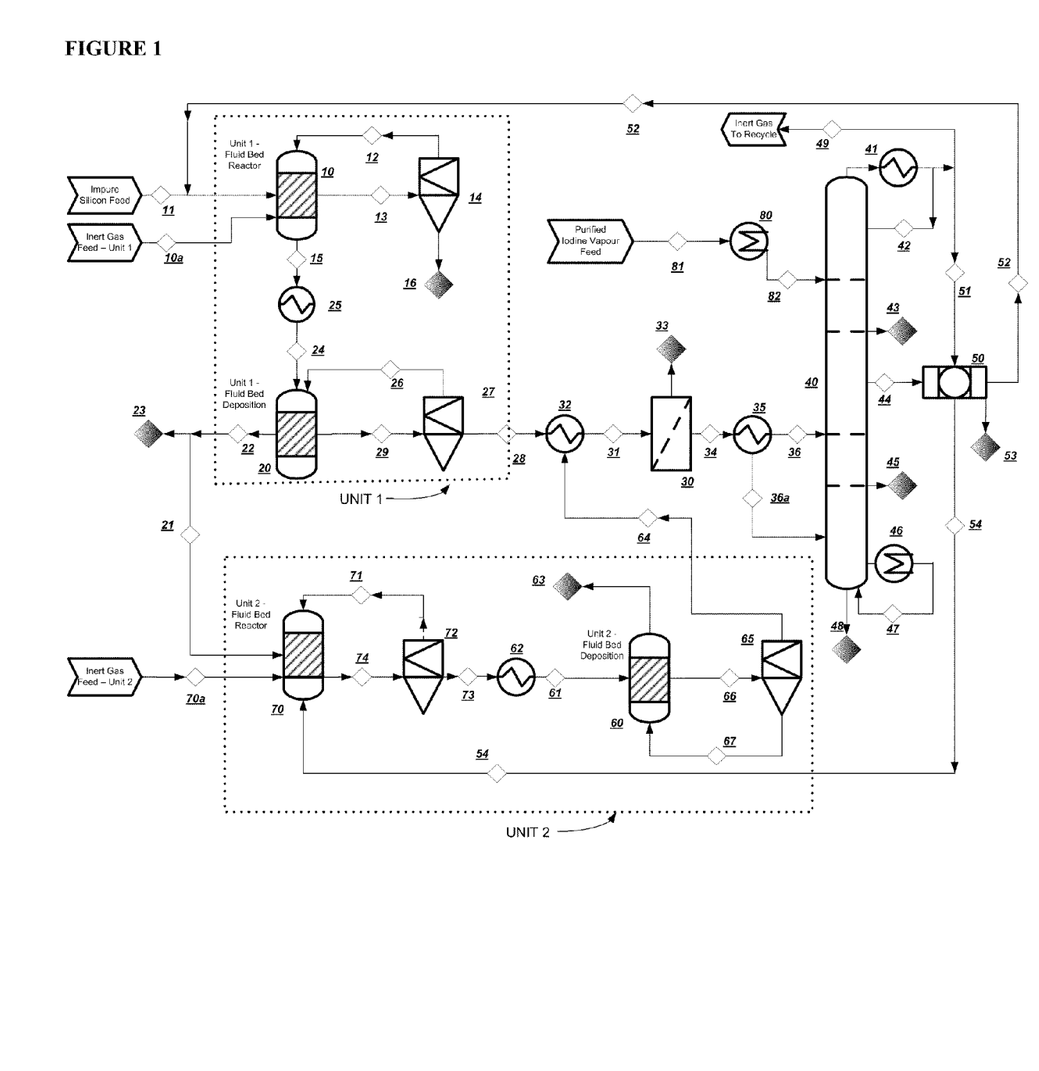
FIG. 1 is a schematic diagram of the apparatus illustrating the flow of materials for the commercial production of PV- and EG-silicon.

Referring generally to FIG. 1, an impure silicon feed is introduced via conduit 11 into the dense phase of a first fluidized bed 10 in Unit 1 which is a dual fluidized bed system. A liquid mixture 52 including recycled, liquid $SiI_4$ and iodine is vaporized and pumped into Unit 1 with or without the aid of an inert gas 10a such as argon through the bottom portion of fluidized bed 10. The ratio of recycled liquid to impure silicon feed is generally not greater than about 20:1 on a molar basis.

Fluidized bed 10 is maintained at a constant temperature throughout its volume in the range of 1200-1350° C. and may contain inert particles such as high-purity quartz to facilitate proper mixing behavior and also to adjust the ratio of MG-Si-to-recycle liquid 52. It shall be understood that the reactors or vessels provided in accordance with the invention including those for fluidized beds 10, 20, 60, 70 in Units 1 and 2 can be made of construction material typically composed of an outer metal alloy shell that provides structural strength and an inner ceramic shell that is exposed to the bed particles that is resistant to high temperature corrosion by the halogen-bearing vapors contained therein.

The impure silicon feed includes mostly silicon but also contains p- and n-type impurities such as boron and phosphorous and may contain a wide array of metallic and non-metallic elements. The quartz particles are properly sized and generally remain in the dense phase and do not react substantially with the vapors. The impure silicon feed particles in fluidized bed 10 react with vapors of iodine and $SiI_4$ to produce mostly the vapor species $SiI_2$, $SiI_4$, I, $SiI_3$ and iodide vapors of some of the impurity elements. This vapor stream is transported out of the dense-phase of the fluidized bed 10 to a separator 14 such as a cyclone separator via conduit 13 under isothermal conditions. As impure silicon reacts, its particle size and mass are reduced to a point where the fluidizing medium has sufficient momentum to transport the remaining small particles into separator 14 from which they are removed from the process via conduit 16. Generally, the separator 14 is able to remove particles as small as one micrometer in diameter or less. Larger particles that are inadvertently elutriated from the fluidized bed can be separated from the fines and returned to fluidized bed 10 via conduit 12.

A vapor stream less the removed particles can be thus separated for further processing in accordance with the invention. A preferably dust-free vapor thus formed exits the separator and is transported through conduit 15 to a heat exchanger 25 that lowers the temperature by several hundred degrees over a short distance. As the vapor is cooled in this manner there is a tendency for silicon to be deposited either in the gas phase as very small nuclei or as a thin film on the heat exchanger surfaces. The short residence time and flow pattern within the heat exchanger minimizes these tendencies substantially. The cooled vapor thus formed is then fed via conduit 24 into the lower section of the second fluidized bed 20 which is maintained at a constant temperature in the range of 800-1000° C. Alternatively, the heat exchanger 25 may be located within the second fluidized bed 20 and immediately upstream of the distributor plate. A further alternative is proposed wherein the second fluidized bed 20 contains a heat exchange jacket on its shell or inside the dense phase. In this case, the dust-free vapor 15 is kept at the operating temperature of the first fluidized bed 10 until it enters the dense phase of the second fluidized bed 20 and thereafter is cooled by the mass of particles which are at a lower temperature.

The second fluidized bed 20 may include a dense-phase with initial seed particles of high-purity silicon during the startup phase of the process. The fluidized bed 20 may be considered as two distinct phases—a dense phase containing well-mixed suspended particles bathed in vapor and a second phase which includes vapor bubbles that travel upward in a mostly vertical direction. The benefit of bubble formation is to provide for an exceptionally high mixing rate for the solids leading to uniform temperature throughout the bed volume. The disadvantage is that bubbles lead to vapor bypassing the reaction zone and an overall reduction in productivity. In the present case, the vapor which is contained in the bubbles tends to produce silicon mostly in the gas phase while the vapor in the dense phase tends to deposit silicon as a thin film on the particles. The dense phase particles therefore grow during the process while new silicon particle nuclei are added via homogeneous gas-phase reaction of $SiI_2$ within the vapor phase. Because of this behavior, there is generally no need to add new high-purity seed silicon particles during operation of the fluidized bed 20. As the dense phase silicon particles reach larger sizes, it becomes useful to remove these from the fluidized bed 20 via conduit 22. These particles can either be sold 23 or directed to fluidized bed 70 in Unit 2 via conduit 21 to act as starting material for a second purification sequence similar to that previously described.

Some of silicon nuclei which are formed in the gas phase of the fluidized bed 20 are transported via conduit 29 and enter the separator 27 such as a cyclone wherein they are separated from the vapor and exit through the separator and are returned to the fluidized bed via conduit 26. Separator 27 is kept at a temperature which is below about 800° C. to minimize any residual silicon formation downstream of the fluidized bed 20.

Vapor which exits the separator 27 is transported via conduit 28 to heat exchanger 32 which reduces the vapor temperature to 500-700° C., and then the vapor passes through conduit 31 to a high-temperature filter 30 which traps fine particles of impurities such as FeSi and high-melting point iodides as a filter cake. The impurities are periodically removed from filter 30 and collected in vessel 33.

Figure 2:
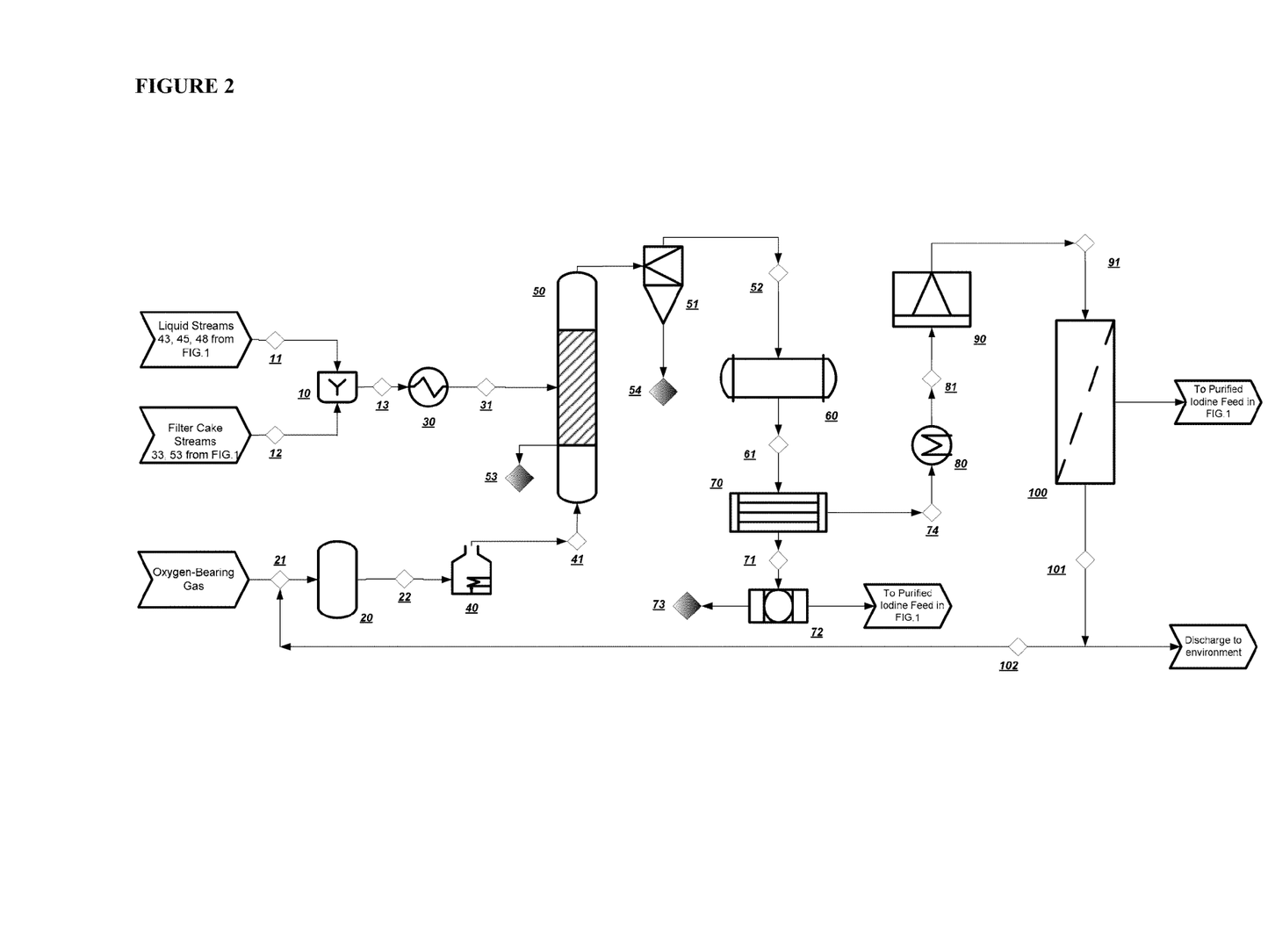
FIG. 2 is a schematic diagram of the apparatus illustrating the flow of materials for the recovery of iodine from waste streams of the process described in FIG. 1.

The filtrate vapor is transferred via conduit 34 to a heat exchanger 35 that reduces the vapor temperature to between 200-300° C. so as to cause condensation of $SiI_4$. The resultant vapor-liquid mixture is split into two streams with some material pumped via conduit 36 into the middle section and some material pumped via conduit 36a into the reboiler section 46 of a continuous tray-tower distillation column 40. Commercial grade iodine raw material or recycled iodine from a waste recovery process (such as shown in FIG. 2) is vaporized and fed through conduit 81 and condenser 80 into the distillation column via conduit 82. The continuous output streams of the distillation column 40 include liquid $SiI_4$ (boiling point, 288° C.) 44, liquid iodine (boiling point, 183° C.) 51, and, if present, argon gas 49. At the top of the column, the continuous reflux 42 is primarily iodine that is condensed within the reflux exchanger unit 41. If inert gas such as argon is used in the process, it is cooled, separated from iodine vapors, and returned via conduit 49 to the process Units 1 and 2 via conduits 10a and 70a, respectively. At the bottom of the column the continuous reboiler 46 acts to control the temperature of the boilup 47 which includes mostly higher boiling point impurities such as aluminum iodide (b.p., 382° C.) and titanium iodide (b.p., 377° C.). During the operation of the distillation column a quantity of impurity liquid is removed on a batch basis from the following column trays: boron iodide (b.p., 210° C.) 43; phosphorous iodide (b.p. 316° C.) and carbon iodide (b.p., 320° C.) 45; and, aluminum iodide and higher boiling point liquid iodides 48. These liquid streams are then sent to a waste iodine recovery process shown in FIG. 2. Liquid iodine from the reflux loop is transported via conduit 51, combined with purified liquid $SiI_4$ via conduit 44 and filtered in a liquid-solid filter 50 to remove any fines suspended in the liquid. These solid fines include impurity iodides and other impurity compounds not trapped by the gas-solid filter 30, purified silicon, and other solid contaminants brought into the process via raw materials or produced via corrosion action on the process vessel walls. Their removal downstream of the distillation column ensures that solids in the recycled streams do not contaminate the process Units 1 and 2. The filter cake 53 is removed periodically from the process. The mixture of purified liquid iodine and $SiI_4$ is recycled through conduits 52 or 54 to Units 1 and 2 of the process, respectively.

In Unit 2, the dual fluidized bed system is repeated as with Unit 1. However, it is noted that the size of equipment and flow rate of materials in this section of the process are not necessarily identical to those in Unit 1. Furthermore, purified silicon from this unit may be combined in different proportions with purified silicon from the previous unit to produce a further tailoring of final silicon product composition of n- and p-type impurities.

Purified silicon particles at the temperature of the fluidized bed 20 are continuously fed by a screw feeder or other mechanical means into the dense-phase of fluidized bed 70 which is held at a temperature of 1200-1350° C. A recycled mixture of liquid $SiI_4$ and iodine is heated and introduced via conduit 54 into the bottom of the fluidized bed. If required in the process an inert gas flow 70a may also be provided. As in Unit 1 the ratio of recycled liquids via conduit 54 to purified silicon feed via conduit 21 is generally not greater than about 20:1, on a molar basis. Fluidized bed 70 is maintained at a constant temperature throughout its volume in the range of 1200-1350° C. and may contain inert particles such as high-purity quartz. The purified silicon particles in fluidized bed 70 react with vapors of iodine and $SiI_4$ to produce mostly the vapor species $SiI_2$, $SiI_4$, I, $SiI_3$, and iodide impurity vapors of mostly B, P, and carbon, as most of the metallic and other non-metallic elements are removed by the process steps previously outlined. This vapor stream is transported out of the dense-phase of the fluidized bed 70 to a separator 72 via conduit 74 under isothermal conditions. As the previously purified silicon particles react, their particle size and mass are reduced to a point where the fluidizing medium has sufficient momentum to transport the remaining small particles into cyclone 72 from which they are captured and returned to the fluidized bed 70 via conduit 71. Particles of previously purified silicon which are too small for removal will be transported along with the vapor from the separator 72 and via conduit 73 into heat exchanger 62 that lowers the temperature by several hundred degrees over a short distance. These particles end up in the fluidized bed 60 as seed particles. When this vapor/solids mixture is cooled in this manner, there is a tendency for silicon to be deposited either in the gas phase as very small nuclei or as a thin film on the heat exchanger surfaces and the entrained particles of purified silicon. The short residence time and flow pattern within the heat exchanger minimizes these tendencies substantially. Alternatively, the heat exchanger 62 may be located within the second fluidized bed 60 and immediately upstream of the distributor plate. The cooled vapor thus formed is then fed via conduit 61 into the lower section of the second fluidized bed 60 which is maintained at a constant temperature in the range of 800-1000° C. As indicated previously, this temperature reduction can also occur within the fluidized bed 60 if a cooling medium is provided on the jacket or within the dense phase. The dense-phase of fluidized bed 60 includes seed particles of high-purity silicon during the startup phase of the process but does not generally require any makeup during operation for reasons previously described. As the dense phase silicon particles reach larger sizes it becomes useful to remove these from the fluidized bed 60 via conduit 63. These particles can either be sold as higher purity silicon or directed to a third Unit and so forth for production of higher purity products.

Some of silicon nuclei formed in the gas phase of the fluidized bed 60 are transported via conduit 66 and enter the separator 65 wherein they are separated from the vapor and are returned to the fluidized bed via conduit 67. Separator 65 is kept at a temperature which is below about 800° C. to minimize any residual silicon formation downstream of the fluidized bed 60. Vapor which exits the separator 65 is transported via conduit 64 to heat exchanger 32 and thus reenters the previous process steps described.

FIG. 2 shows the process flow sheet for the recovery of iodine from waste streams in FIG. 1. It should be noted that the process throughput is typically only around $\frac{1}{100}^{th}$ that of the process previously described and varies with the quantity of impurities in the MG-Si as well as the amount of equipment corrosion products that end up in the waste streams.

Liquid streams 43, 45, 48 from the distillation column 40 in FIG. 1 are fed either individually or in combination via conduit 11 to a mixing vessel 10 at a temperature between 200-300° C. Filter cake solids streams 33, 53 from the process described in FIG. 1 are fed either individually or in combination via conduit 12 into mixing vessel 10. The relative proportion of streams 11 and 12 varies according to the contaminant composition, in particular the level of boron, phosphorous, lead, arsenic and mercury. In cases where the content of these particular impurities is too high to achieve adequate iodine recovery then the particular stream containing the impurity is processed individually in the fashion described henceforth.

The liquid-solid mixture is transferred via conduit 13 to a heater 30 which increases the stream temperature to around 400° C. The heated slurry is then sprayed via conduit 31 into the lower-section of a fluidized bed reactor 50 containing inert particles such as silica and operated at absolute pressures of less than about 1000 kPa. The fluidized bed 50 is maintained at temperatures ranging from 400-900° C. depending on the composition of impurity elements in the stream within conduit 31. An oxygen-bearing gas is fed via conduit 21 into a tower containing silica gel or other absorbent that reduces moisture content down to several parts per million. This step is beneficial to reduce the possibility of significant amounts of water entering the process in FIG. 1 along with the recycled iodine. Dried oxygen-bearing gas is then pumped via conduit 22 into a gas-fired heater 40 which raises the temperature of stream 41 to 500-900° C. and is then introduced into the bottom section of the fluidized bed 50 at velocities sufficient to provide adequate mixing of the inert particles.

In fluidized bed 50 the oxygen in the gas stream 41 reacts with solid and liquid impurity iodides contained in stream 31 to produce solid oxides and a vapor containing $I_2$ and I. Over 95 wt % of impurity iodides react in this manner. The stable solid oxides of key elements that are totally recovered at 700° C. in an atmosphere containing a stoichiometric excess of oxygen are as follows: $Fe_2O_3$, $Al_2O_3$, $VO_2$, $TiO_2$, CaO, NiO, $Mn_2O_3$, $Cr_2O_3$, MgO, $ZrO_2$, CuO, CdO, $SnO_2$, $Bi_2O_3$, $SbO_2$, SrO, $TeI_2$, $In_2O_3$, $CO_3O_4$, and $Ga_2O_3$. The solid oxides of these impurity elements are produced in the fluidized bed either on a silica particle surface or in the gas phase. The oxides of boron, $B_2O_3$, and arsenic, $As_2O_5$, can be either a solid or liquid in the fluidized bed depending on whether the temperature is above or below about 450° C. and 600° C., respectively. In the case where defluidization occurs due to the presence of liquid oxides then either a two-stage oxidation is appropriate or the fluidized bed 50 can be operated in the fast-fluidization regime to effectively eliminate this potential problem.

If the oxides form on a silica particle then these particles grow in size over time and are eventually removed from the fluidized bed via conduit 53. Similarly if the oxide nuclei that form in the gas phase are large enough to remain suspended in the fluidized bed then they too will grow in time and eventually be removed via conduit 53. However, some of the gas-phase oxides form particles or liquid droplets that are too small and therefore can be elutriated from the fluidized bed 10 and enter a separator 51 wherein they are separated in stream 54 from the gases. The liquid oxides of boron and arsenic that enter the separator 51 would be converted to solids due to the lower operating temperature.

The particle-free vapor stream which is at a temperature of 300-400° C. emerges from the separator 51 and is directed via conduit 52 into one or more heat exchangers 60. The heat exchanger 60 reduces the temperature of the vapor stream to around 200° C. at the outlet and then the vapor is transferred via conduit 61 to a condenser 70 that brings the temperature of vapor to slightly above the melting point of iodine (i.e., 113° C.). In the condenser, the iodine vapor starts to condense at around 183° C. near the entrance of condenser 70. Along the length of the condenser the partial pressure of pure iodine vapor is reduced from 760 mm Hg at the entrance down to around 80 mm Hg near the exit. In this manner about 80-90 wt % of the incoming iodine to the condenser 70 is converted to liquid form. The condensed liquid iodine is then pumped into a liquid-solid filter 72 via conduit 71 which removes any residual fine particles not captured by cyclone 51. In addition the filter 72 also removes a phosphorous oxide, $(P_2O_5)_2$, which is formed at around 200° C. in condenser 70 from the vapor of the same composition. The filter cake produced in filter 72 is removed via conduit 73 and the filtrate liquid iodine is sent to the purified iodine feed shown in FIG. 1

The vapor stream from condenser 70 is then pumped via conduit 74 into a cooling-water heat exchanger 80 and via conduit 81 into a refrigeration unit 90 followed by transport via conduit 91 into a cloth-filter 100 operated below about 10° C. During these process steps the iodine vapor is converted to a solid form and recovered as filter cake that is recycled to the purified iodine feed in the process of FIG. 1. Since the partial pressure of pure iodine in the gas stream at these temperatures is reduced to below about 0.1 mm Hg, then in this way most of the remaining iodine is recovered. The filtrate gas stream containing oxygen and small amounts of $CO_2$ is then transferred via conduit 101 into a splitter whereby some of the gas is recycled to the iodine recovery process via 102 to stream 21 and some of the gas is discharged into the ambient environment.

Figure 3:
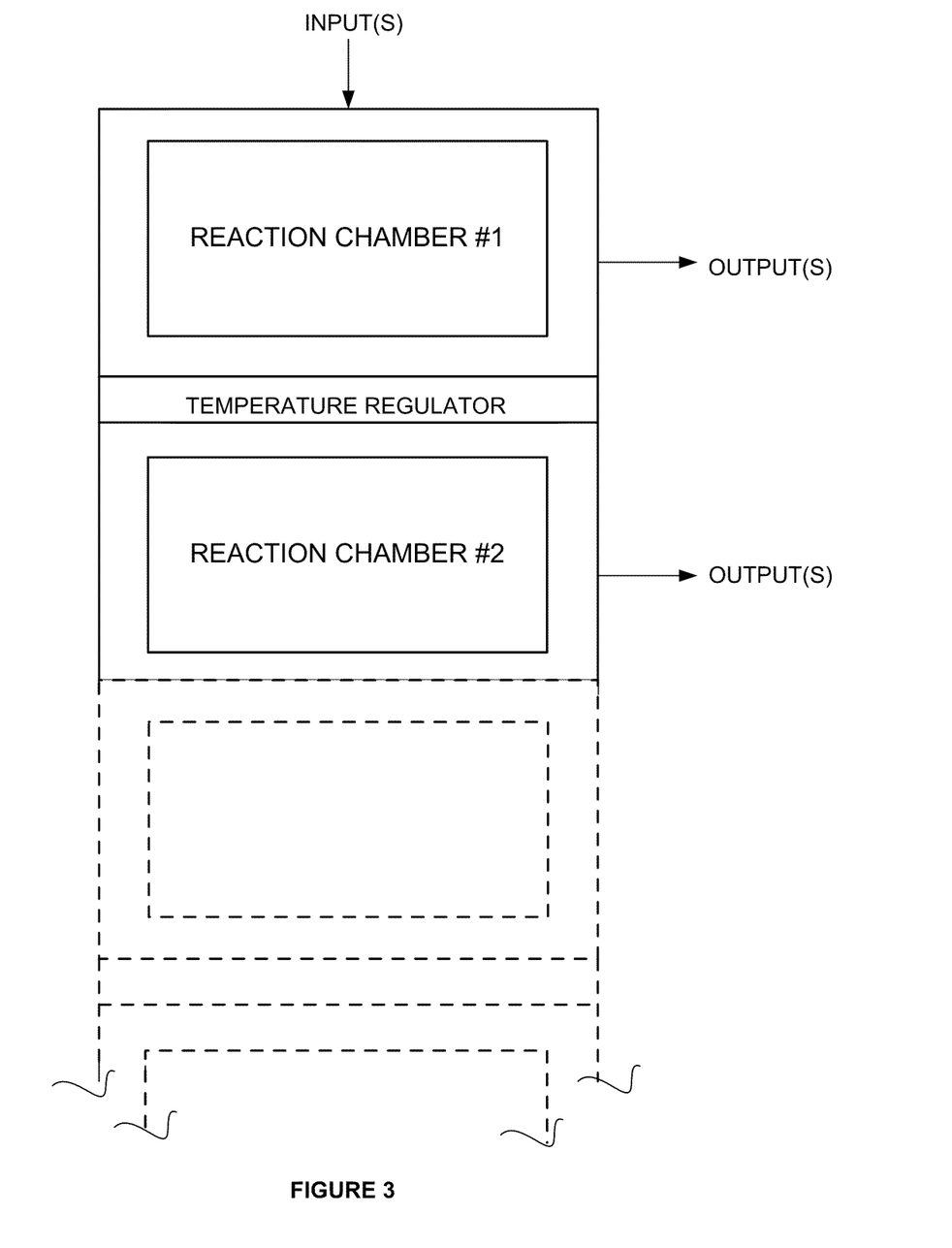
FIG. 3 is a diagram of an integrated silicon purification or deposition system with dual reaction chambers.

FIG. 3 illustrates another aspect of the invention that provides a series of one or more silicon processing modules. Depending on particular applications, the modules may be configured for silicon purification, silicon deposition or other silicon processing. A preferable embodiment of the invention provides a silicon processing module with dual reaction chambers. For example, a reaction chamber #1 may be temperature regulated for generating a silicon iodide vapor product operating within a first temperature range. This chamber may receive one or more various inputs or feeds of silicon processing materials such as impure silicon feeds, inert gas/solid materials, and iodine or silicon iodide vapor mixtures, as described elsewhere herein. In a preferable embodiment of the invention, each chamber may be configured with apparatus to serve two roles: a silicon reactor with a fluidized bed of silicon and inert materials in accordance with another aspect of the invention; and a separator (such as a cyclone separator) for separating silicon iodide vapor product. In alternate embodiments of the invention, each role may be carried out in separate equipment such as a series of thermally controlled and fluidly connected reactors and separators (see. FIG. 1). The silicon iodide vapor product produced in reaction chamber #1 may be passed through a temperature regulator to a reaction chamber #2 operating within a second temperature range. A solid silicon product may be thus formed in accordance with the invention having a selected level of purity as a result of a temperature gradient between the reaction chambers, with or without the presence of silicon seed particles in reaction chamber #2. The temperature regulator may be any apparatus for creating or maintaining desired intermediary temperature ranges. A preferable embodiment of the invention includes a heat exchanger positioned between the first and the second temperature regulated vessels to provide selectable temperature gradients therebetween to facilitate formation of solid silicon products. In a preferable embodiment, the silicon iodide vapor product may be transferred to a fluidized bed within reaction chamber #2 maintained at a relatively lower temperature which may contain at least some pure silicon seed particles in suspension. Silicon iodide vapor product such as $SiI_2$ can be therefore allowed to react both in a vapor phase to produce pure solid silicon product, and also on seed particles to form thin films which may be removed from reaction chamber #2. As silicon particles reach larger sizes, they may be removed as a commercial end product itself, or serve as starting material or system input for another processing or purification sequence which may be repeated as described above in another successive silicon processing module. As with other embodiments of the invention herein, the illustrated silicon processing modules may be connected in a serial manner. Further processing or purification can be achieved by passing silicon iodide vapor and/or other inputs into successive modules.

The foregoing is considered as illustrative only of the principal of the invention. Further, since numerous modifications and changes will occur to those persons skilled in the art, it is not desired to limit the invention to the exact construction and operation shown and described, and accordingly all suitable modifications and equivalents may be resorted to falling within the scope of the invention as defined by the claims which follow.

What is claimed is:

1. A silicon processing module, comprising:
   a first temperature regulated chamber that generates a silicon iodide vapor product, wherein the first temperature regulated chamber operates within a temperature range between about 1200° C. and 1350° C.;
   a second temperature regulated chamber separate from the first temperature regulated chamber, wherein the second temperature regulated chamber receives the silicon iodide vapor product from the first temperature regulated chamber, and wherein the second temperature regulated chamber operates within a temperature range between about 800° C. and 1000° C.; and
   a heat exchanger positioned between the first and the second temperature regulated chambers for providing selectable temperature gradients therebetween to facilitate formation of solid silicon product,
   wherein the first temperature regulated chamber includes a first fluidized bed and/or the second temperature regulated chamber includes a second fluidized bed.

2. The silicon processing module of claim 1, wherein the first temperature regulated chamber includes said first fluidized bed.

3. The silicon processing module of claim 2, wherein the second temperature regulated chamber includes said second fluidized bed.

4. The silicon processing module of claim 2, wherein the first temperature regulated chamber is configured to form a mixture of vapors, including $SiI_2$, $SiI_4$, $I_2$, I and iodine-bearing vapors of impurities, from an impure solid silicon feedstock into the first temperature regulated chamber.

5. The silicon processing module of claim 4, wherein the first temperature regulated chamber comprises purified recycled silicon-bearing vapors comprising $SiI_4$ and $I_2$ vapors.

6. The silicon processing module of claim 1, wherein the first temperature regulated chamber includes a first fluidized bed reactor and the second temperature regulated chamber includes a second fluidized bed reactor, wherein the first fluidized bed reactor is maintained at a temperature between about 1200° C. and 1350° C. and the second fluidized bed reactor is maintained at a temperature between about 800° C. and 1000° C.

7. The silicon processing module of claim 1, wherein the first temperature regulated chamber includes a separator for separating silicon iodide vapor products.

8. The silicon processing module of claim 7, wherein the separator is a cyclone separator.

9. The silicon processing module of claim 1, wherein the second temperature regulated chamber includes a separator for separating silicon iodide vapor products.

10. The silicon processing module of claim 1, wherein the second temperature regulated chamber includes a fluidized bed that includes pure silicon seed particles in suspension.

11. The silicon processing module of claim 10, wherein the fluidized bed is configured to allow the silicon iodide vapor product to react in a vapor phase to produce pure solid silicon product.

12. The silicon processing module of claim 11, wherein the fluidized bed is configured to allow the silicon iodide vapor product to react on the pure silicon seed particles to form thin films.

13. The silicon processing module of claim 1, further comprising successive processing modules downstream from the silicon processing module, the successive processing modules configured to accept silicon iodide vapor from the silicon processing module.

14. A module for processing silicon, comprising:
a first temperature regulated chamber operating within a first temperature range between about 1200° C. and 1350° C., the first temperature regulated chamber having one or more inputs comprising an impure solid silicon feedstock and purified recycled silicon-bearing vapors, the purified recycled vapors including $SiI_4$ and $I_2$ vapors, and an output comprising silicon iodide vapor product, wherein the first temperature regulated chamber is configured to:
generate a mixture of vapors, the mixture of vapors including $SiI_2$, $SiI_4$, $I_2$, I and iodine-bearing vapors of impurities, from the impure solid silicon feedstock; and
separate the silicon iodide vapor product from the mixture of vapors;
a second temperature regulated chamber separate from the first temperature regulated chamber and operating within a second temperature range between about 800° C. and 1000° C., the second temperature regulated chamber having as input the silicon iodide vapor product from the first temperature regulated chamber, the second temperature regulated chamber configured to generate solid silicon product from reaction of the silicon iodide vapor product in a vapor phase and reaction of the silicon iodide vapor product on pure silicon seed particles; and
a heat exchanger disposed between the first and the second temperature regulated chambers, the heat exchanger configured to provide selectable temperature gradients therebetween to facilitate formation of solid silicon product,
wherein the first temperature regulated chamber includes a first fluidized bed and/or the second temperature regulated chamber includes a second fluidized bed.

15. The module of claim 14, wherein the first temperature regulated chamber includes said first fluidized bed and the second temperature regulated chamber includes said second fluidized bed.

16. The module of claim 15, wherein the second fluidized bed is has a relatively lower temperature than the first fluidized bed.

17. The module of claim 16, wherein the second fluidized bed is said second temperature range.

18. The module of claim 17, wherein the first fluidized bed is said first temperature range.

19. The module of claim 14, further comprising a third temperature regulated reaction chamber downstream from the second temperature regulated reaction chamber, the third temperature regulated reaction chamber having as input a silicon iodide vapor product from the second temperature regulated reaction chamber.

20. The silicon processing module of claim 14, further comprising a distillation column downstream of said second temperature regulated chamber, wherein said distillation column is operated under vacuum.

21. The silicon processing module of claim 1, wherein the second temperature regulated chamber comprises silicon seed particles.

* * * * *